July 31, 1928.
J. L. CREVELING
ELECTRIC SYSTEM
Original Filed Dec. 7, 1925
1,678,808
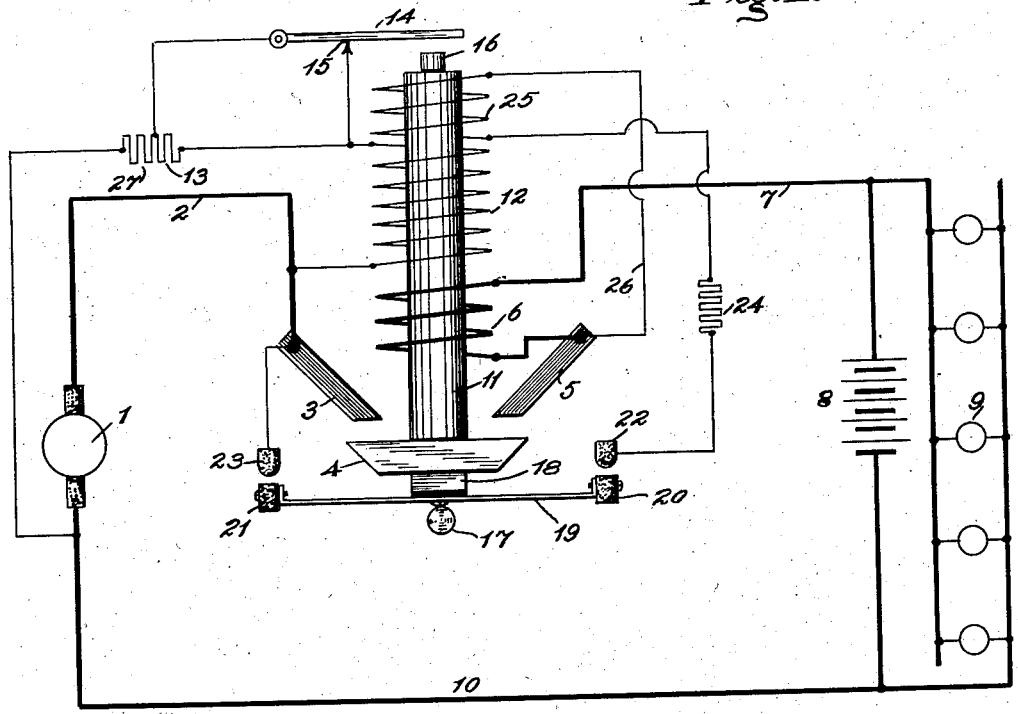
Fig. I.
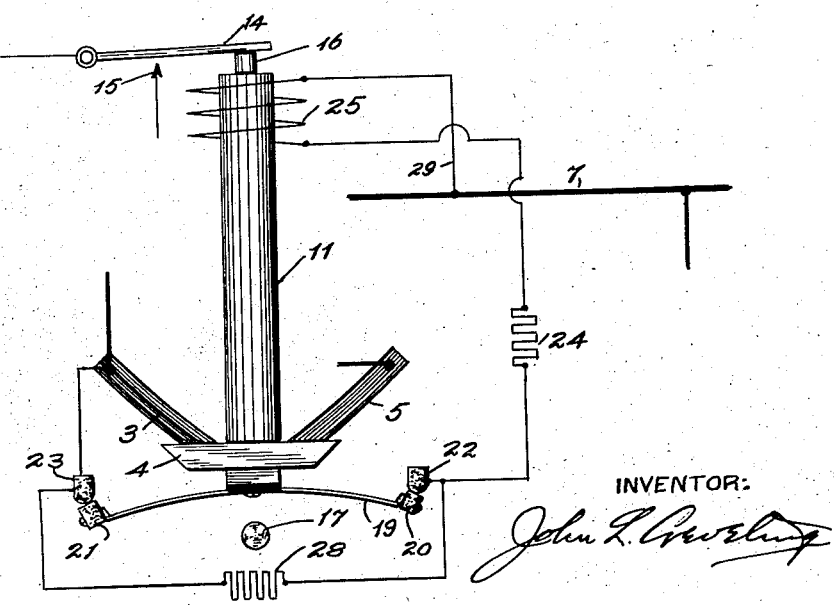
Fig. II.
INVENTOR:
John L. Creveling Patented July 31, 1928.

1,678,808

UNITED STATES PATENT OFFICE.

JOHN L. CREVELING, OF NEAR TUCSON, ARIZONA, ASSIGNOR, BY MESNE ASSIGNMENTS, TO SIMPLEX EQUIPMENT COMPANY, INC., OF NEW YORK, N. Y., A CORPORATION OF DELAWARE.

ELECTRIC SYSTEM.

Application filed December 7, 1925, Serial No. 73,538. Renewed May 9, 1928.

My invention pertains to that class of electric systems wherein a dynamo or generator is used to charge a storage battery and operate lamps or other translating devices which are supplied by the battery when the dynamo is inoperative. As such systems are particularly applicable for the lighting of railway cars wherein the dynamo is driven at variable speed and subjected to stopping and starting, my invention will be described with particular reference to such a car lighting system.

In the drawing, Fig. I is a diagrammatic representation of one type of system comprehending the elements of my invention; and Fig. II is a diagrammatic representation of a portion of the system illustrated in Fig. I, which illustrates certain parts of the system of Fig. I in another position of operation.

Referring particularly to Fig. I, 1 represents a dynamo or generator which may be of any suitable type as ordinarly used for the lighting of a railway car, it being understood that the generator is provided with a proper regulating means to compensate for reversals in direction of rotation and for speed changes in such manner that the generator is suitable for charging the storage battery and maintaining the lamps or other translating devices whenever its speed is above a predetermined value. As such generators, together with their regulating devices, are now common articles of commerce and well-known in the art, details, further than the mere diagrammatic representation of such a machine, are omitted for the sake of simplicity and clearness in illustration.

The principal object of my present invention is to provide automatic means for connecting the generator with the storage battery when their electromotive forces are substantially equal and as nearly as possible exactly equal, and to disconnect the generator from the battery when the electromotive force of the generator is very slightly below that of the battery so as to prevent more than a negligible back discharge from the battery therethrough.

It is a further object of my invention that the generator shall be connected with and disconnected from the battery in the proper manner throughout a considerable change in the battery voltage which, in practice, is more or less variable within certain reasonably wide limits, which may depend upon the condition of charge of the battery. In many practical operating systems in use today, the voltage at which it is desirable to connect the generator and the battery varies from 28 to 40 volts, or thereabouts.

The dynamo 1 has its positive brush connected as by wire 2 with the flexible brush 3 adapted to make contact with the conducting member 4 when said member 4 is sufficiently raised. 5 is a flexible brush similar to that shown at 3 and connected through the solenoid 6 with the wire 7 which is carried to the positive side of the storage battery 8 and the positive side of the lamps or other translating devices indicated at 9— return from the translating devices 9 and the battery 8 being made to the generator through the wire 10. 11 is a core of iron or other magnetic material within the solenoid 6 and united to the conducting member 4 in such manner as to lift the same into contact with the brushes 3 and 5 when the core 11 is sufficiently raised. 12 is a voltage coil or winding surrounding the core 11 and tending when energized to lift the same and cause contact between 3, 4 and 5. The coil 12 is connected, as indicated, in shunt across the generator leads, and has in series therewith a resistance comprising portions 27 and 13, the portion 13 of which is shunted out as by means of the lever 14 and contact 15, when the core 11 is in the position indicated in Fig. I, in which position 13 is substantially ineffective and 27 is so proportioned that the coil 12 tends to close the circuit at 3—4—5, when a voltage is reached by the generator slightly below that at which it is desired at any time to connect the dynamo with the battery circuit. 16 is an extension carried by the core 11 and may be made of insulating material so arranged that when the core has been raised until the contact between 3—4—5 is almost made, the lever 14 will not be affected; but, when the core 11 travels further and completes the contact 3—4—5, the lever 14 will be lifted from the contact 15 and throw the resistance 13 in series with the coil 12. The arrangement of the solenoid 6 is such that when current flows from the generator to the battery 8 or translating devices 9, such current tends to assist the coil 12 in raising the core 11 and preserving a good contact at 3—4—5, while a reversal of current, as when the battery discharges through the dynamo, tends to weaken the effect of coil 12 and cause the core 11 to drop into the position shown in Fig. I in the drawing, (where its downward motion is limited by the stop 17), and open the contact 3—4—5.

The member 4 carries the member 18, of insulating material, upon which is mounted the flexible spring conducting member 19, carrying at one extremity a carbon block 20 and at its other extremity a like carbon block 21. When the core 11 is slightly raised, the carbon block 20 comes into contact with the carbon block 22, while the carbon block 21 comes into contact with the carbon block 23 electrically connected with the brush 3. The block 22 is connected, as through an adjustable resistance 24, with one end of the coil 25, the opposite end of which is connected as by wire 26 with the brush 5. As the core 11 is lifted, it first causes a very light contact between blocks 20—22 and blocks 21—23, which contacts, therefore, have a high resistance. The establishing of these contacts connects the coil 25 across the brushes 3 and 5 through this high resistance; and I so wind the coil 25 that, if the battery voltage be above that of the generator when this light contact between the carbon blocks is made, the current flowing from the battery through coil 25 and through the generator will tend to oppose the coil 12 and prevent the same from raising the core 11 further, until the generator voltage has risen. If the generator voltage now rise somewhat, the coil 12 will increase the pressure upon the carbon contacts between blocks 20—22 and blocks 21—23, so as to appreciably lower the resistance thereof and cause the coil 25 to be connected across the brushes 3 and 5 through a lesser resistance than before, which, however, will not cause a proportionately greater current in the coil 25, as the difference in voltage between the generator and storage battery has been decreased. This current now flowing through the coil 25, by opposing the coil 12, will prevent the contact 3—4—5 from being closed until the voltage of the generator is substantially equal to or slightly above that of the battery, when the opposition of the coil 25 will be withdrawn and coil 12 will establish the contact 3—4—5 with the generator and battery when their voltages are substantially equal, and, by short-circuiting the coil 25, render it substantially ineffective.

I so arrange the member 16 and the contact lever 14 and cooperating contact 15 that just before contact 3—4—5 is made, the contact 14—15 is broken and the shunt around that portion of the resistance 13, in series with the coil 12, is therefore opened and this portion 13 of the resistance is included in series with the coil 12 causing the same to use less current while the contact 3—4—5 remains closed, as it does not require as much current to hold the contact closed as it did to lift the core 11 and close the same.

In Fig. II like numerals are used to indicate like parts, and the only modification intended to be brought out in this figure resides in a high resistance 28 which may be connected across the blocks 22 and 23, and wire 29 is connected directly with wire 7. The other instrumentalities shown in this figure indicate the positions of the parts of Fig. I when the contact 3—4—5 is made.

An operation of my invention is substantially as follows:

If the generator be at rest, the contact 3—4—5 will be open as indicated in Fig. I, and the translating devices 9 may be supplied by the battery 8 in a well-known manner. With the structure as shown in Fig. I, there will be no back discharge from the battery 8 to the generator. If the generator be started, some current will flow through the coil 12 and through the resistance 27, while the resistance 13 will be substantially shunted out by means of the contact at 14—15. When the voltage of the generator reaches a value which is the minimum at which it is ever desired to connect the generator with the battery, coil 12 will lift the core 11 and bring the carbon blocks 20—21 into light contact with the carbon blocks 22—23; and, if the voltage of the generator now be slightly below that of the battery 8, some current will flow back from the battery 8 through the winding 25 in such manner as to oppose the coil 12 and cause the contact 3—4—5 to remain broken. If the generator voltage be raised slightly, the core 11 will be raised so as to bend the spring 19 and increase the pressure upon the carbon contacts so as to reduce the resistance thereof, and coil 25 will now be more effective than when the resistance caused by the carbon contacts was higher, and thus prevent the contact 3—4—5 from being closed until the difference in voltage across the coil 25 is substantially nil or even until the direction of the current therein has changed to cause the said coil to slightly assist the coil 12, whereupon the contact 3—4—5 will be closed and the contact 14—15 opened to insert the resistance 13 in series with the coil 12, and the movable parts indicated in Fig. II will be in the positions shown in said figure. As the current to the battery and translating devices increases, it will by flowing through coil 6 assist in holding the contact 3—4—5 closed and insure considerable pressure thereupon, which may flex the brushes, if desired, as indicated in Fig. II. If, now, the generator slow down and its voltage fall very slightly below that of the battery 8, the back discharge through the coil 6, by opposing coil 12 which is now somewhat weakened owing to the resistance 13, will cause the contact 3—4—5 to be broken and the coil 25 to remain connected across the break. The current flowing back through the coil 25 to the generator will further weaken the coil 12 and thus cause the core 11 to drop into the position shown in the figure, cutting off all connection between the generator and the battery upon a very slight difference in voltage. If the generator voltage again rise, the above outlined cycle will be repeated.

It will be noted in the above described operation that the contact 3—4—5 will always be broken while the contacts 20—22, 21—23 are still made, which will suppress any appreciable sparking at the brushes 3 and 5, and that sparking at 20—22, 21—23, will be substantially suppressed as the contacts between the carbon blocks first increase in resistance and reduce the current through coil 25 to almost zero before an actual break is made. Further, if the resistance 28 is employed, this, though very high in value, will tend to suppress the sparking at the carbon contacts and may be used so as to allow a very small back discharge through the generator, of such small value that its drain upon the battery will be negligible, though such discharge may be quite serviceable in causing the generator 1 to build up properly at starting. The wire 29 being connected directly with the wire 7, in this figure, the current circulating through the coil 25 will not traverse the coil 6, as it does in the arrangement shown in Fig. I; and, therefore, the effect of such current in the coil 6 is eliminated, as may be desired in some applications of my invention.

I do not wish in any way to limit myself to any of the details of construction or modes of operation herein given to illustrate an embodiment of my invention for it will be obvious that wide departure in the way of details, both in construction and operation, may be made without departing from the spirit and scope of my invention which is as set forth in the following claims:

I claim—

1. The combination with a generator, a storage battery charged thereby, means for connecting and disconnecting the generator and battery and operating means for said connecting means, of means for determining the point of operation of said connecting means functionally adjusted by said operating means.

2. The combination with a generator and a storage battery charged thereby, means for connecting and disconnecting the generator and battery and operating means for said connecting means, of means for determining the point of operation of said connecting means controlled and adjusted by the operation of the connecting means comprehending a coil magnetically cooperating with the connecting means.

3. The combination with a generator and a storage battery charged thereby, means for connecting and disconnecting the generator and battery and operating means for said connecting means, of means for determining the point of operation of said connecting means affected by the operation of the connecting means comprehending a coil magnetically cooperating with the connecting means and adjusted by the connecting means.

4. The combination with a generator, a storage battery charged thereby, means for connecting and disconnecting the generator and battery and operating means for said connecting means, of means for affecting said operating means including a coil and means controlling and adjusting the effect thereof affected by the operating means.

5. The combination with a generator, a storage battery charged thereby, means for connecting and disconnecting the generator and battery and operating means for said connecting means, of means for affecting said operating means including a coil and means controlling and adjusting the effect thereof affected by the operating means and also by its own effects.

JOHN L. CREVELING.